No. 814,704. PATENTED MAR. 13, 1906.
G. H. HULETT.
CAR DUMPING APPARATUS.
APPLICATION FILED MAR. 13, 1905.

6 SHEETS—SHEET 2.

WITNESSES
E. Nottingham
G. F. Downing

INVENTOR
G. H. Hulett
By H. A. Seymour
Attorney

No. 814,704. PATENTED MAR. 13, 1906.
G. H. HULETT.
CAR DUMPING APPARATUS.
APPLICATION FILED MAR. 13, 1905.

5 SHEETS—SHEET 3.

WITNESSES

INVENTOR
G. H. Hulett
By A. A. Seymour
Attorney

No. 814,704. PATENTED MAR. 13, 1906.
G. H. HULETT.
CAR DUMPING APPARATUS.
APPLICATION FILED MAR. 13, 1905.
5 SHEETS—SHEET 4.
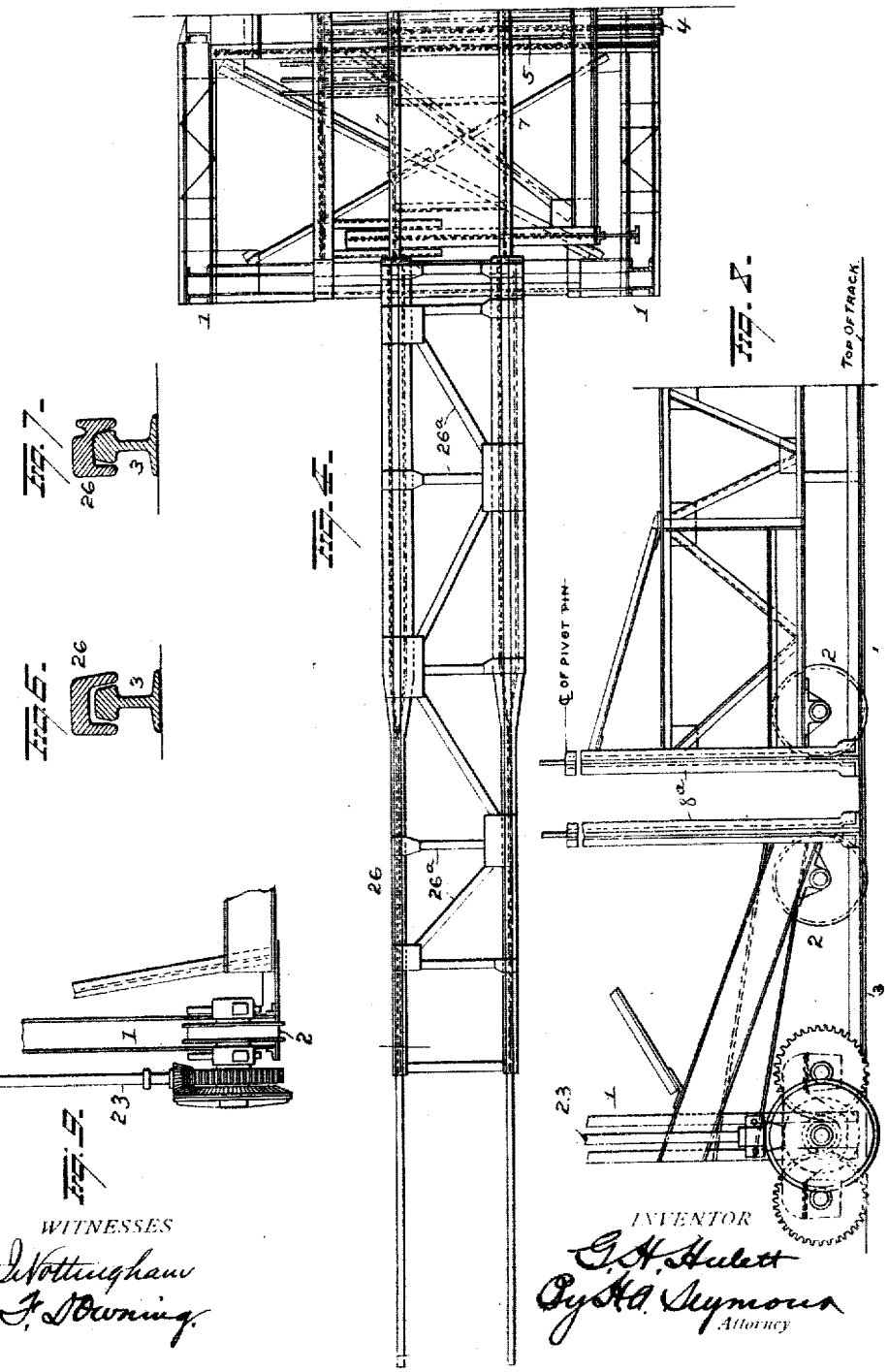

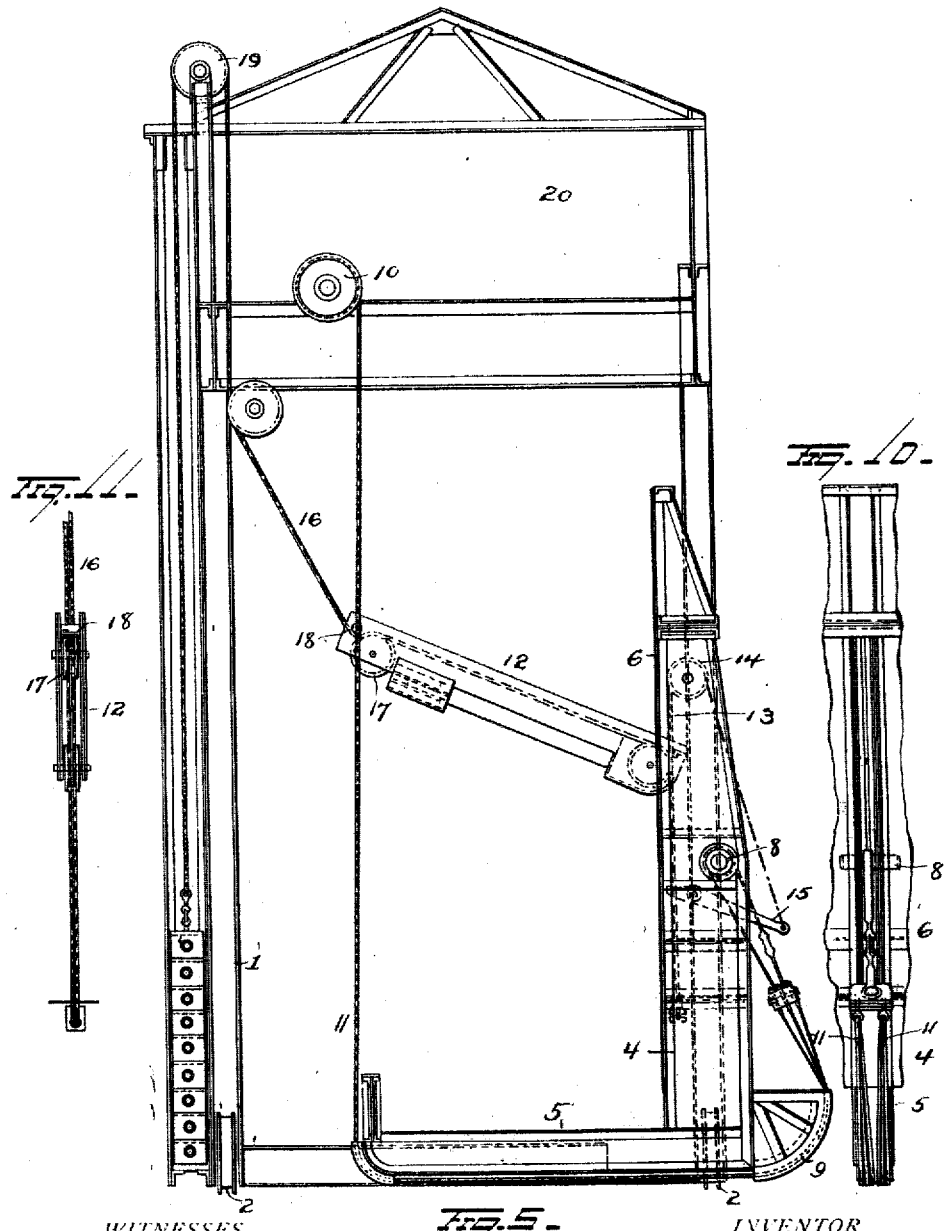

UNITED STATES PATENT OFFICE.

GEORGE H. HULETT, OF CLEVELAND, OHIO, ASSIGNOR TO THE WELLMAN-SEAVER-MORGAN COMPANY, OF CLEVELAND, OHIO.

CAR-DUMPING APPARATUS.

No. 814,704.          Specification of Letters Patent.          Patented March 13, 1906.

Application filed March 13, 1905. Serial No. 249,947.

*To all whom it may concern:*

Be it known that I, GEORGE H. HULETT, residing at Cleveland, in the county of Cuyahoga and State of Ohio, have invented certain new and useful Improvements in Car-Dumping Apparatus; and I do hereby declare the following to be a full, clear, and exact description of the invention, such as will enable others skilled in the art to which it appertains to make and use the same.

My invention relates to an improved car-dumping apparatus, the object of the invention being to provide a movable apparatus mounted on wheels upon a track or tracks and having improved means for side dumping the cars and to so construct the apparatus as to permit the cars to be run thereon, dumped, and run off the other end of the apparatus without interfering with incoming loaded cars.

With these and other objects in view the invention consists in certain novel features of construction and combinations and arrangements of parts, as will be more fully hereinafter described, and pointed out in the claims.

Figure 1:
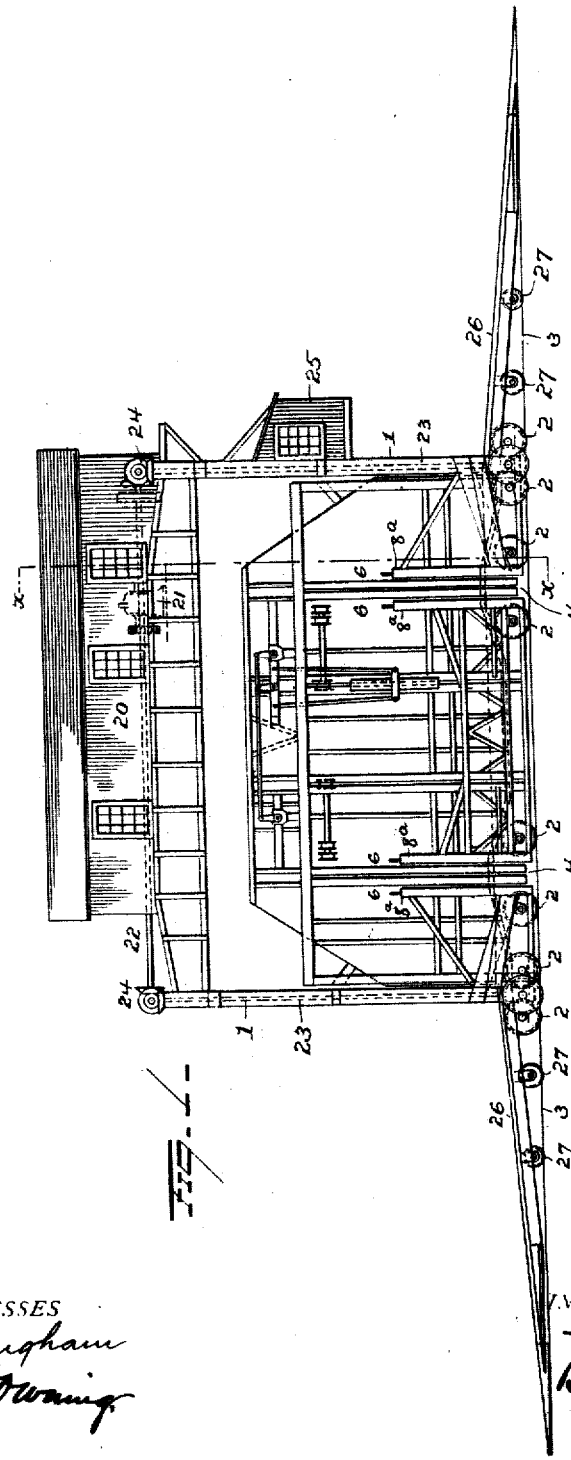
Figure 2:
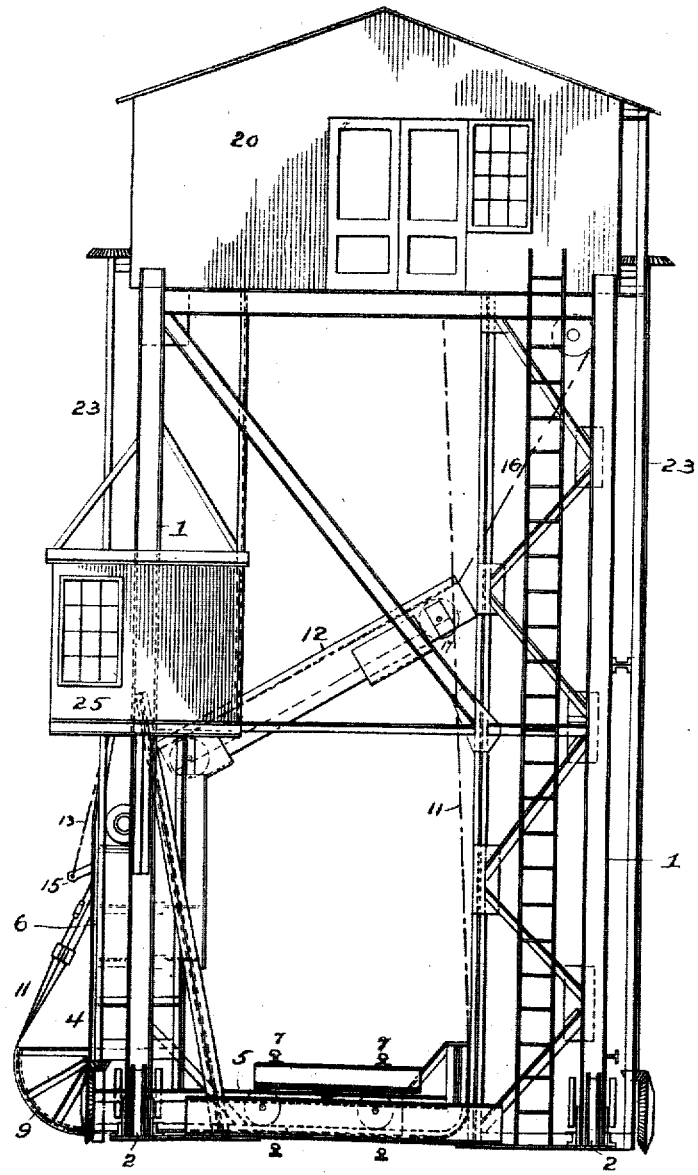
Figure 3:
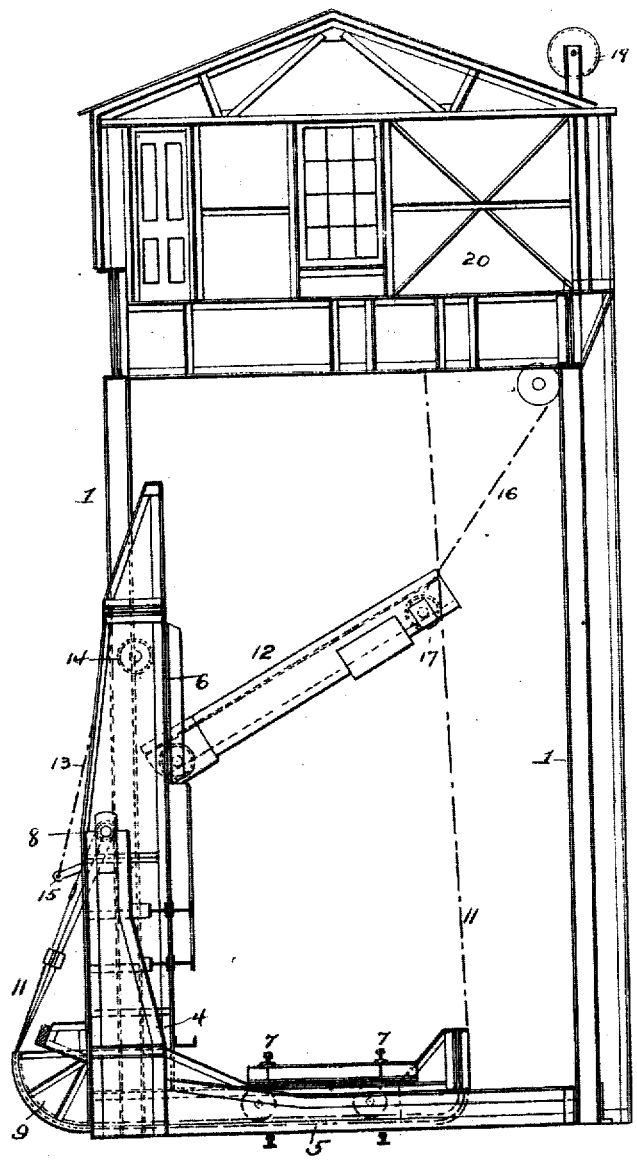

In the accompanying drawings, Figure 1 is a view in side elevation illustrating my improvements. Fig. 2 is a view in end elevation. Fig. 3 is a view in section on the line $x$ $x$ of Fig. 1. Fig. 4 is a plan view. Fig. 5 is an enlarged view illustrating the cradle. Figs. 6 and 7 are enlarged views of details of the approach-tracks. Fig. 8 is a detail view showing the supports for the pivot-posts and a portion of the propelling mechanism. Fig. 9 shows an edge view of the propelling mechanism shown in Fig. 8. Fig. 10 is a view showing a portion of the cradle in front elevation. Fig. 11 is an edge view of the clamping-beam 12.

1 represents a frame or tower supported on wheels 2, mounted to run on a track or tracks 3 and movable wherever desired along the dock or elsewhere. A cradle 4, comprising a normally horizontal platform 5 with uprights 6 at one end, is provided with a track 7 to receive the cars, and the upright members 6 are fulcrumed between their ends on a shaft 8, supported by posts 8ª. The tilting chains or cables 11, which are preferably of the formation shown, are connected with the shaft 8, thence pass down around segments 9 at the angle of the cradle, thence beneath the cradle and up over a pulley or drum 10 and are controlled by any desired mechanism not necessary to here describe. It will thus be seen that when cable 11 is drawn up the cradle 4, with a car thereon, will be tilted to one side and dump the contents of the car from one side thereof. To hold the car on the track while being dumped, a series, preferably four, of clamps 12 is provided. These clamps 12 are supported at one end by chains 13, passed over pulleys 14 and connected with levers 15, to adjust the clamps up and down to accommodate different-sized cars, and chains or cables 16 are secured to this same end of the clamps, extend along the clamps, and pass between pulleys 17 and pins 18 at their other ends, and thence up and over pulleys 19 at the top of the tower and are heavily counterweighted at their lower ends. By this arrangement of parts it will be observed that it is not necessary to secure the clamp down on the car, for when the latter is tilted the chains or cables 16 will be supporting the tilt of the car, and the clamps will be securely held against the top thereof.

In a cab 20 on top of the tower 1 a motor 21 is located and through the medium of shafts 22 and 23 and gear 24 propels the tower along its track to any point desired, and the movements of cradle 4 and other mechanism can also be controlled from this cab or from a cab 25 at one end of the tower.

At both ends of the tower track-sections 26 are hinged, as shown, to allow for any unevenness in the track. These track-sections 26 are hinged on a level with the cradle-track and incline downward and rest on the track 3 and are beveled or thinned at their outer ends to permit the cars to be easily run thereon or therefrom. The rails of these hinged track-sections 26 are braced by cross and diagonal bars 26ª, as shown in Fig. 4, and supported on small rollers 27, Fig. 1, mounted on the track, and throughout the upper portions of such rails they are of the general inverted-U shape shown, while the lower outer portions of the rails have grooves to receive the wheel-flanges and guide the wheels onto the track or receive the wheels therefrom.

With the construction set forth cars can be run onto the cradle from one end of the tower and when dumped can be run out the other end of the tower and not interfere with incoming loaded cars, thereby facilitating the loading and unloading and increasing the capacity of the apparatus.

A great many slight changes might be made in the general form and arrangement of the parts described without departing from my invention, and hence I do not restrict myself to the precise details set forth, but consider myself at liberty to make such slight changes and alterations as fairly fall within the spirit and scope of my invention.

Having fully described my invention, what I claim as new, and desire to secure by Letters Patent, is—

1. The combination with a frame or tower, of a cradle, comprising a horizontal platform and uprights at one end pivotally supported between their ends, chains or cables secured to the pivotal point of the cradle, a segment at the angle of the cradle, and said chains or cables passed around the segment, thence beneath the platform, and upward over a pulley, and means for controlling the movement of the cradle.

2. In a car-dumping apparatus, the combination with a tower, and a cradle pivotally mounted therein, of clamps for holding a car on the cradle, weighted cables attached to said clamps, pivoted levers, pulleys above the clamps and cables attached at one end to the clamps, passed over the pulleys and connected at their other ends to said levers.

In testimony whereof I have signed this specification in the presence of two subscribing witnesses.

GEORGE H. HULETT.

Witnesses:
C. W. COMSTOCK,
JOHN G. MACGREGOR.